United States Patent [19]

Frank

[11] Patent Number: 5,457,478

[45] Date of Patent: Oct. 10, 1995

[54] CONTROL DEVICE

[75] Inventor: Edward H. Frank, Portola Valley, Calif.

[73] Assignee: FirstPerson, Inc., Mountain View, Calif.

[21] Appl. No.: 248,578

[22] Filed: May 24, 1994

Related U.S. Application Data

[63] Continuation of Ser. No. 966,734, Oct. 26, 1992, abandoned.

[51] Int. Cl.⁶ .................................................. G09G 3/02
[52] U.S. Cl. .......................... 345/158; 345/166; 348/734; 340/825.69; 340/825.72; 359/148; 359/142
[58] Field of Search .................... 340/710, 706, 340/825.69, 825.72; 358/194.1, 335; 359/148, 142, 143, 145; 345/156, 157, 158, 169, 162, 166, 163; 348/734

[56] References Cited

U.S. PATENT DOCUMENTS

| | | | |
|---|---|---|---|
| 4,521,772 | 1/1983 | Lyon | 340/710 |
| 4,623,887 | 5/1984 | Welles, II | 340/825.57 |
| 4,751,505 | 6/1986 | Williams et al. | 340/710 |
| 4,796,019 | 1/1989 | Auerbach | 345/169 |
| 4,807,052 | 2/1989 | Amano | 340/825.72 |
| 4,825,209 | 4/1989 | Sasaki et al. | 340/825.72 |
| 4,859,995 | 8/1989 | Hansen et al. | 340/710 |
| 4,880,967 | 11/1989 | Kwang-Chien | 340/710 |
| 4,935,619 | 6/1990 | Heberle | 340/710 |
| 5,028,919 | 7/1991 | Hidaka | 340/825.69 |
| 5,075,558 | 12/1991 | Nakagawa | 340/710 |
| 5,081,534 | 8/1989 | Geiger et al. | 358/194.1 |
| 5,086,298 | 4/1990 | Katsu et al. | 340/825.69 |
| 5,109,482 | 4/1992 | Bohrman | 395/154 |
| 5,115,227 | 5/1992 | Keiji | 340/710 |
| 5,146,210 | 9/1992 | Heberle | 340/706 |
| 5,204,768 | 4/1993 | Tsakiris et al. | 358/194.1 |

*Primary Examiner*—Tommy P. Chin
*Assistant Examiner*—A. Au
*Attorney, Agent, or Firm*—Irell & Manella

[57] ABSTRACT

A control device method and apparatus has application for use in multi-media systems. The multi-media system contains a host computer having a video display, a control device and at least one target device. The target device is any remotely controlled equipment that the user wishes to integrate into the multi-media system. The host computer contains a host system configuration which provides the user the ability to select an operating mode for the control device. The control device operates as an interactive user interface to control a cursor on the host computer video display when the control device is placed in the cursor control mode. The user selects a remote control mode to remotely control the target devices using the control device. The host system configuration also includes learn and computer networking modes. In the learn mode, control data information is entered into the host system configuration for new target devices. In the computer networking mode, the control device operates as a network interface allowing other similarly equipped computers to communicate with the host computer.

18 Claims, 8 Drawing Sheets

CONTROL DEVICE

This is a continuation of application Ser. No. 07/966,734 filed Oct. 26, 1992, now abandoned.

BACKGROUND OF THE INVENTION

1. Field of the Invention

The present invention relates to a control device, and more particularly, to an apparatus and method for communicating between a host computer system and at least one target system with a remote control system.

2. Art Background

A mouse, or a cursor control device, is an instrument that is used to translate the motion of a user's hand into a series of electrical control signals indicative of that hand movement. The mouse is coupled to a computer where the mouse generated control signals are used to position a cursor on a computer display. An optical mouse is a cursor control device that uses optical sensing to generate the electrical control signals. An advantage of the optical mouse over a traditional mechanical mouse is that the optical mouse does not employ any moving parts to generate the control signals. The optical mouse emanates an optical signal, usually in the infrared range, generated from a light emitting diode (LED). To generate the control signals, the mouse is moved on a reflective pad having a large number of equally spaced vertical and horizontal lines. The vertical and horizontal lines have a different color than the background of the reflective pad. The optical mouse is placed on the reflective pad such that the optical light from the LED is reflected from the pad back into the optical mouse.

The optical mouse further includes input optics and optical sensors mounted on the bottom of the mouse. The optical sensors generate an electrical signal proportional to the light incident upon the optical sensor. The LED and the optical sensors are arranged such that the light emanating from the LED is reflected off the pad and onto the optical sensors. To operate the mouse, a user moves the optical mouse across the reflective pad such that the optical light crosses over the horizontal and vertical lines. The amount of light reflected is decreased when the light crosses over one of the horizontal or vertical lines on the pad. Consequently, the light incident upon the photo diodes is decreased, and the mouse is able to detect the crossing of the line. The optical mouse generates four quadrature signals to indicate the movement to the computer based on the mouse crossing the horizontal and vertical lines. Typically, these four parallel quadrature signals are coupled to a standard serial interface such as a universal asynchronous receiver transmitter (UART). The UART converts the quadrature signals into an encoded stream of serial data for transmission to the host computer system.

Applications in optical transmissions are also found in consumer electronic devices. Consumer electronics devices, such as televisions and video cassette recorders (VCRs), often include remote control systems. Manual control systems, unlike remote control systems, require the user of the electronic device to physically go to the device to manipulate knobs and buttons. With the use of remote control, the user can control the device, from a limited distance, with a remote control unit thereby eliminating the need to physically touch the controls and adjustments on the device itself. The basic remote control system contains a transmitter on the remote control unit and a receiver on the device. The remote control unit contains buttons where each button correlates to a device function. Each function is represented by an unique function code having a string of logical ones and zeros. When the user presses a button on the remote control unit for a desired function, the remote control unit retrieves the corresponding function code and transmits it to the device. Various manufacturers of remote control systems use both different function codes and encoding techniques to modulate the function codes. The device receives the modulated function code, demodulates the code back into a string of ones and zeros, and performs the desired function.

Figure 1:
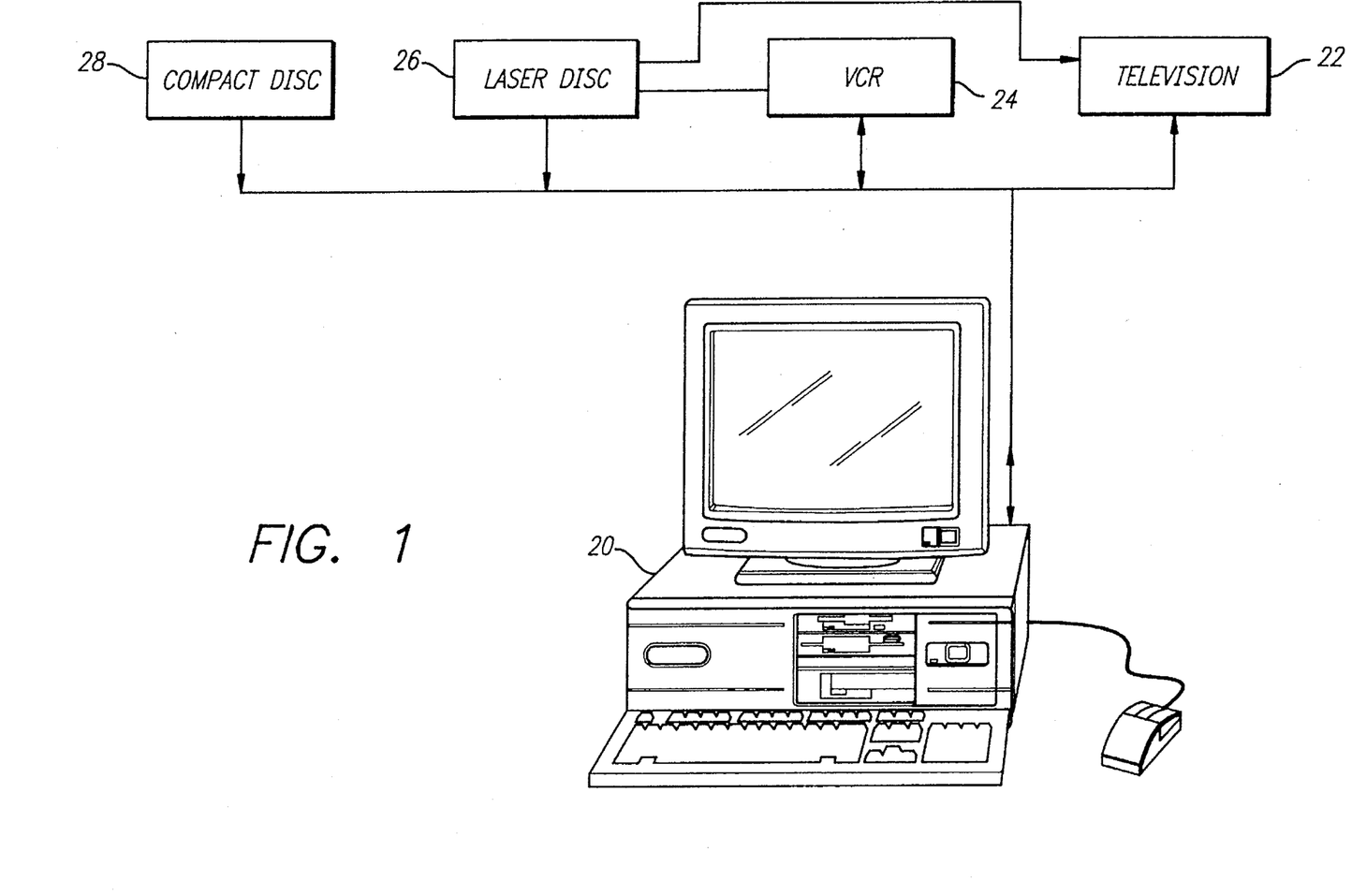
FIG. 1 illustrates a multi-media system including a central control computer.

Multi-media is the integration of several audio and video production units into a single controllable unit. Multi-media projects cover many communication media types, including printed materials, audio programs, television shows, feature films and many others. The ability to integrate the functions of the resources utilized in the production of multi-media projects into a single shared system provides a level of performance and capability unknown in the prior art. A computer workstation may be the center of such a system by providing memory and digital processing capabilities. Referring to FIG. 1, a multi-media system is illustrated. A central control computer 20 is networked to: television 22; video cassette recorder (VCR) 24; video laser disc 26; and compact audio disc 26. With such an integrated system, the user, at central control computer 20, can transfer information among the devices attached to the integrated network.

A multi-media system, such as the one illustrated in FIG. 1, provides the user with a very powerful audio visual production center. For example, the user may wish to manipulate a video image stored on laser disc 26. First, the video image must be transferred over the network from laser disc 26 and stored in memory in central control computer 20. To accomplish this task, the user would command, by a remote control unit, laser disc 26 to play the video image over the network. After the video image is transferred to central control computer 20, the user may add special effects to the video image creating these effects directly on the computer. After generating the enhanced video image, the user may wish to store the video image on VCR 24. To accomplish this task, central control computer 20 sends the video image via some kind of interconnect (often in analog video), and the user remotely controls VCR 24 to record the enhanced video image. In this example, in order to control both laser disc 26 and VCR 24, the user is required to use two remote control devices. Furthermore, the user is required to use a computer interactive device such as a mouse.

SUMMARY OF THE INVENTION

Therefore, it is an objective of the present invention to integrate a control device such that the control device may operate both as a cursor control device and a remote control device. It is a further objective of the present invention to provide a network interface among similarly equipped computer systems having a control device of the present invention.

The present invention comprises of a host computer having a video display, a control device including a reflective pad and at least one target device. The target devices are remotely controlled audio and video equipment. The control device is coupled to the host computer through an interface. A host system configuration resides on the host computer allowing the user to control the operation of the control device by selecting a mode. The host system configuration includes a target device list which contains identifying names for the target devices currently supported by the host computer. For each target device on the target device list, there is a corresponding function list. The function list contains control data for each function of the target device supported by the host system configuration. If no mode is selected, the control device operates in a cursor control mode. From the host system configuration, the user may select a remote control, learn or computer networking modes.

The control device has an encoder coupled to a transmitter, and a decoder coupled to input optics. When the control device is operating in the cursor control mode, the user moves the control device across the reflective pad to control the movement of a cursor on the host computer video display. The transmitter of the control device emanates a signal, preferably in the optical range, which is reflected off the reflective pad and into the input optics. The input optics amplifies the reflected signal for input to the decoder. The decoder generates position signals based on the intensity of the reflected signal. When the control device is in the remote control mode, the host computer sends target device control data over the interface to the encoder. The encoder generates an analog signal from the control data, and modulates the transmitter with the analog signal. To control the target device, the user holds the control device such that the bottom of the device is pointed at the target device. Upon depressing a switch on the control device, the control device transmits the modulated signal to the target device.

The learn mode of the present invention allows the host system configuration to "learn" control data for functions of a target device. In the learn mode, new target devices are added to the target device list. In addition, control data is added to the function list for the corresponding target device. The control device also operates as a computer network interface when the user selects the computer networking mode from the host system configuration. In the computer networking mode, the host computer sends information, modulated by the encoder in the control device, to target computers equipped with the control device of the present invention. The target computer sends modulated messages to the host computer which are decoded in the control device and subsequently transferred to the host computer.

DETAILED DESCRIPTION OF THE INVENTION

A method and apparatus for a control device is disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 2:
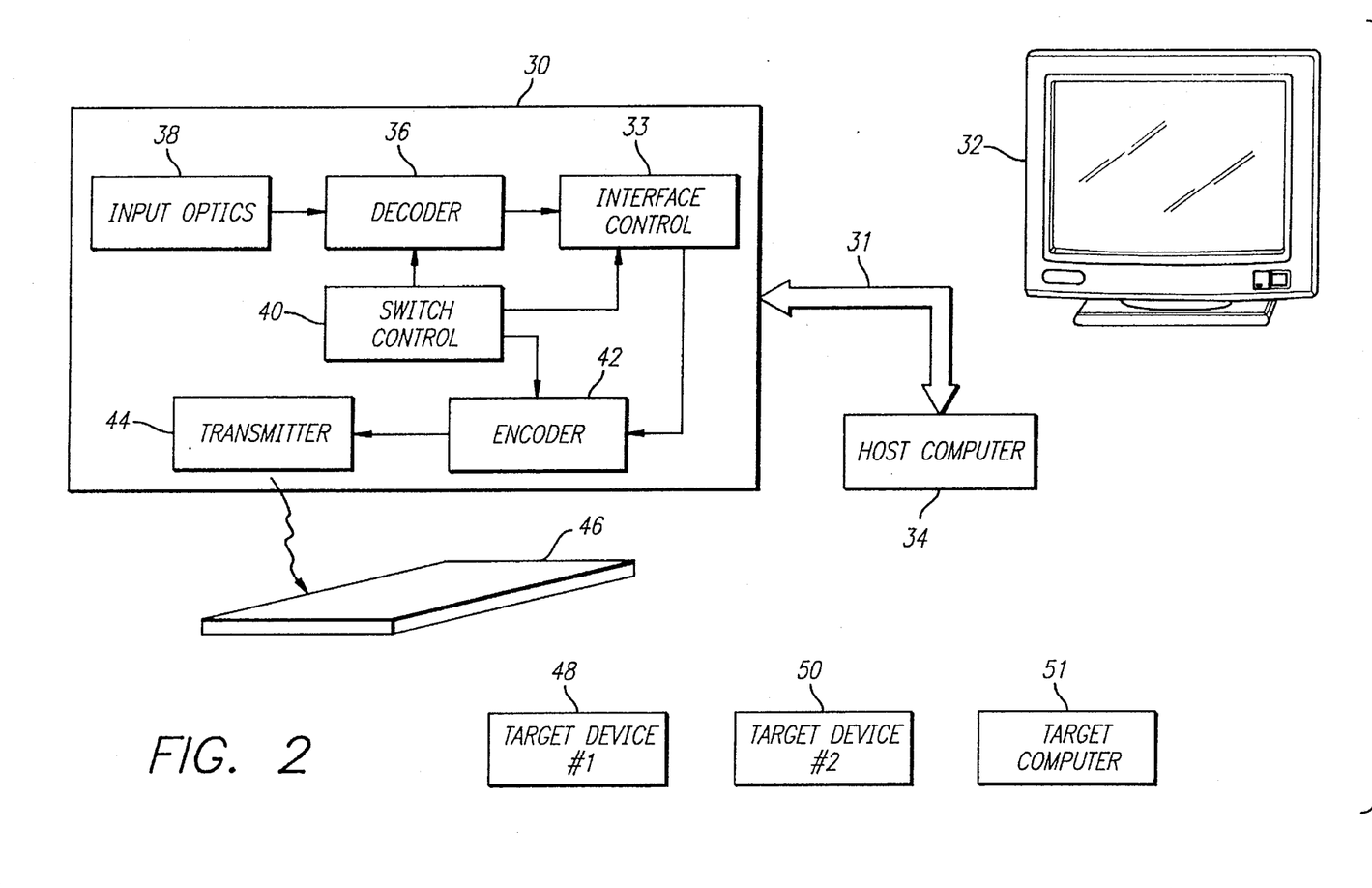
FIG. 2 is an illustration of the control device of the present invention.

Referring to FIG. 2, a high level block diagram of the present invention is illustrated. Host computer 34 is coupled to control device 30 through interface 31. The host computer 34 may be a computer system such as a SPARC™ workstation, manufactured by Sun Microsystems, Inc. of Mountain View, Calif. Interface 31 is bi-directional such that host computer 34 transmits information to control device 30, and control device 30 transmits information to host computer 34. Control device 30 inputs external signals through input optics 38, and the external signals are interpreted by decoder 36. Information generated by decoder 36 is transferred to interface control 33, and then transmitted through interface 31 to host computer 34. Information transmitted from host computer 34 over interface 31 is received by control device 30 at interface control 33. The information is then transferred to encoder 42 and subsequently transmitted by transmitter 44.

Host computer 34 provides a user the ability to select among a plurality of operating modes for control device 30. These operating modes include a cursor control mode, a remote control mode, a learn mode and a computer networking mode. If no mode is selected by the user, control device 30 operates in the cursor control mode. In the cursor control mode, control device 30 will be placed on top of reflective pad 46. When the user selects either the remote control or the learn mode, control device 30 will operate as a remote control device. When used as a remote control device, the bottom of control device 30 is directed at a target device, such as target device 48 or 50. Also, when the user selects the computer networking mode from host computer 34, control device 30 operates as a network interface. In the computer networking mode, the bottom of control device 30 is directed at a target computer such as target computer In the cursor control mode, control device 30 is a cursor control device. As a cursor control device, position data is generated by decoder 36 based on the movement of control device 30 on reflective pad 46. Position data are transferred from decoder 36 to interface control 33 and then transmitted over interface 31 to host computer 34. In the cursor control mode, datum is not transferred from the host computer 34 to control device 30. Because of this, encoder 42 of control device 30 is bypassed such that transmitter 44 will provide a continuous signal output to reflective pad 46. The continuous output signal is reflected by reflective pad 46 back toward control device 30. The reflected signal is collimated and amplified by input optics 38 and projected upon photosensitive cells in decoder 36. Because the system is in cursor control device mode, decoder 36 is selected to decode the illumination of the photosensitive cells to generate position data. The position data are then transferred to the host computer 34 to control a cursor on video output display 32.

To select a particular mode for control device 30, the user, though a man to machine interface on host computer 34, activates a mode selection menu. Because a mode has not been selected, control device 30 will automatically operate in the cursor control mode. The mode selection menu may be displayed and accessed by the user by any type of man to machine interface. Preferably, a graphical user interface is used, and control device 30 modes are viewed by user as icons. Regardless of how the man to machine interface is accomplished, host computer 34 will display the mode selection to the user on video output display 32. The user may use a keyboard, or control device 30 as a cursor control device, to select the desired operating mode for control device 30. Once a mode has been selected, another menu will appear prompting the user to make more selections for the desired function as will be more fully explained below.

Figure 3:
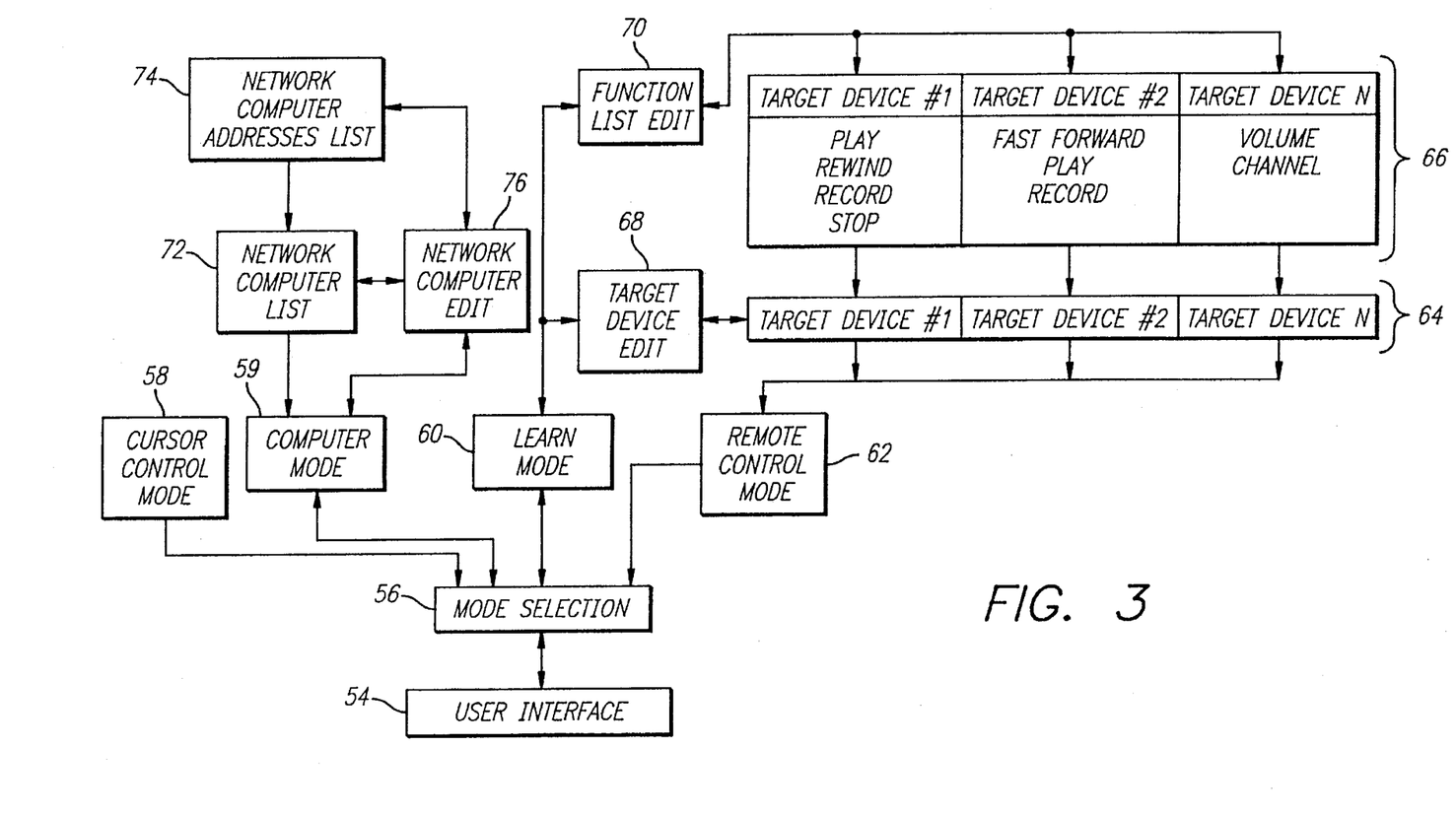
FIG. 3 is an illustration of the host system configuration of the present invention.

Referring to FIG. 3, the host system configuration of the present invention is illustrated. In order to support the remote control, learn, and computer networking modes, host computer 34 must contain specific information about target devices and target computers. User interface 54 is the man to machine interface between the host system configuration and the user. Any user interface may be employed to implement the structure of the host system configuration. Mode selection module 56 illustrates the first level of the host system configuration. As described above, mode selection module 56 provides a menu from which the learn, remote control, and computer networking modes are selected. To support the selection of remote control mode, remote control mode module 62 accesses target device list 64. Target device list 64 comprises a list of all the target devices currently supported by the host system configuration. For each target device in target device list 64, there is a corresponding function list illustrated as function list 66. As illustrated in FIG. 3, a target device may only access the corresponding target device function list that corresponds to that target device. Function list 66 stores control data for each of the target device functions listed in function list 66. For example, for target device #1, there is a target device #1 function list which stores the control data for all of the currently supported target device #1 functions.

Still referring to FIG. 3, learn mode module 60 is selected from mode selection module 56. Learn mode module 60 provides the user the ability to edit target device list 64 and function list 66. If the user wishes to add another target device to the host system configuration, then target device edit module 68 allows the user to enter an identifying name for the new target device. Once target device list 64 has been edited to contain the new target device, function list edit module 70 allows the user to add target device functions to function list 66. In the learn mode, control data will be entered into function list 66 under the corresponding function. When control device 30 is in the computer networking mode, computer mode module 59 is selected by mode selection 56. Computer mode module 59 contains network computer list 72, network computer address list 74 and network computer edit 76. The user has the ability to select a target computer from network computer list 72. If the desired target computer is not listed on network computer list 72, then network computer edit module 76 is activated which allows the user to add an identifying name for the new target computer. Similarly, network computer addresses are added by the user for the newly added target computer through computer network edit 76.

Figure 4:
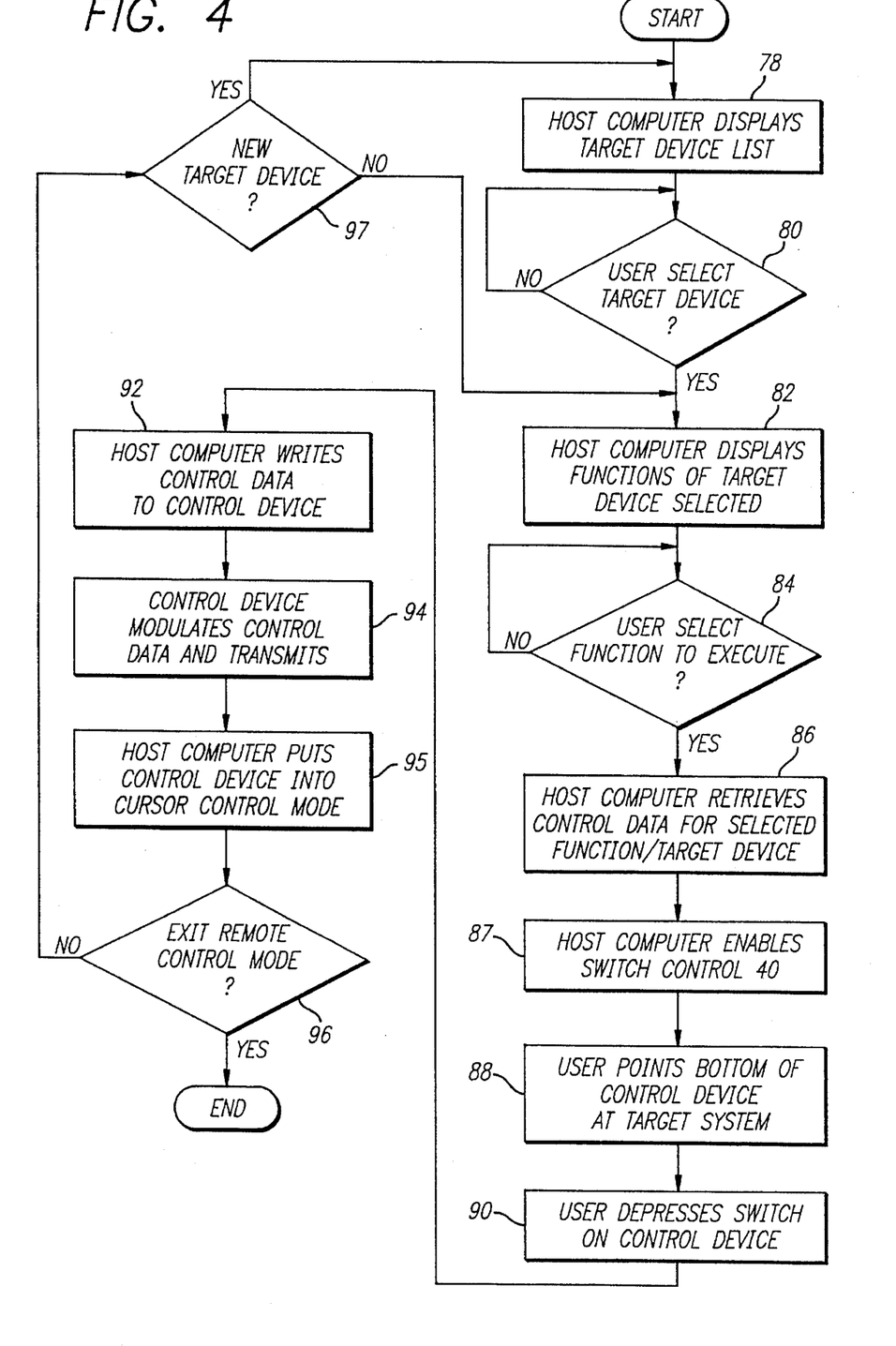
FIG. 4 is a flow control diagram of the remote control mode of the present invention.

Referring to FIG. 4, a flow diagram of the remote control mode is illustrated. In the remote control mode, control device 30 operates as a remote control device which controls virtually any product utilizing a remote control system. After the user has selected the remote control mode through mode selection module 56, host computer 34 displays a list of the available target systems as shown in block 78. In block 80, the user is prompted to select a target device. For example, the user may select a first VCR which is identified on the target device list as "VCR #1". Upon selection of the desired target device, the host computer 34 displays a function list for the particular target device selected as illustrated in block 82. Next, host computer 34 will prompt the user to select a desired function from the function list as shown in block 84. For example, if "VCR #1" is chosen as the target device, the function list will display all functions for "VCR #1" residing in the function list. The function list for "VCR #1" may contain "Power", "Play", "Rewind", "Fast Forward" and "Record".

Upon completion of selecting the desired function by the user, host computer 34 retrieves the control data stored in the function list for the corresponding selected target device as shown in block 86. In block 87, host computer 34 transmits a message through interface 31 which enables switch control 40. Then, in block 88, the user points the bottom end of control device 30 at the target device. In block 90, the user depresses a switch located on control device 30 which converts control device 30 from a cursor control device to a remote control device. The depressing of the switch initiates the transmission of the control data from host computer 34 to control device 30 as illustrated in block 92. In block 94, control device 30 reconstructs the control data in the original analog format, and transmits the control data to the target device. After the control data has been transmitted, the host computer 34 places control device 30 in the cursor control mode as shown in block 95. The user now has full use of control device 30 as an interactive cursor control device. In block 96, host computer 34 queries the user about whether to remain in the remote control mode. If the user wishes to remain in the remote control mode, host computer 34 will prompt the user as to whether a new device is desired, as illustrated in block 97. If the user does wish to execute another function for the target device selected, then host computer 34 will display the target device list. Alternatively, host computer 34 will display the target system as shown in block 78, and the user may then select a new target device.

Figure 5:
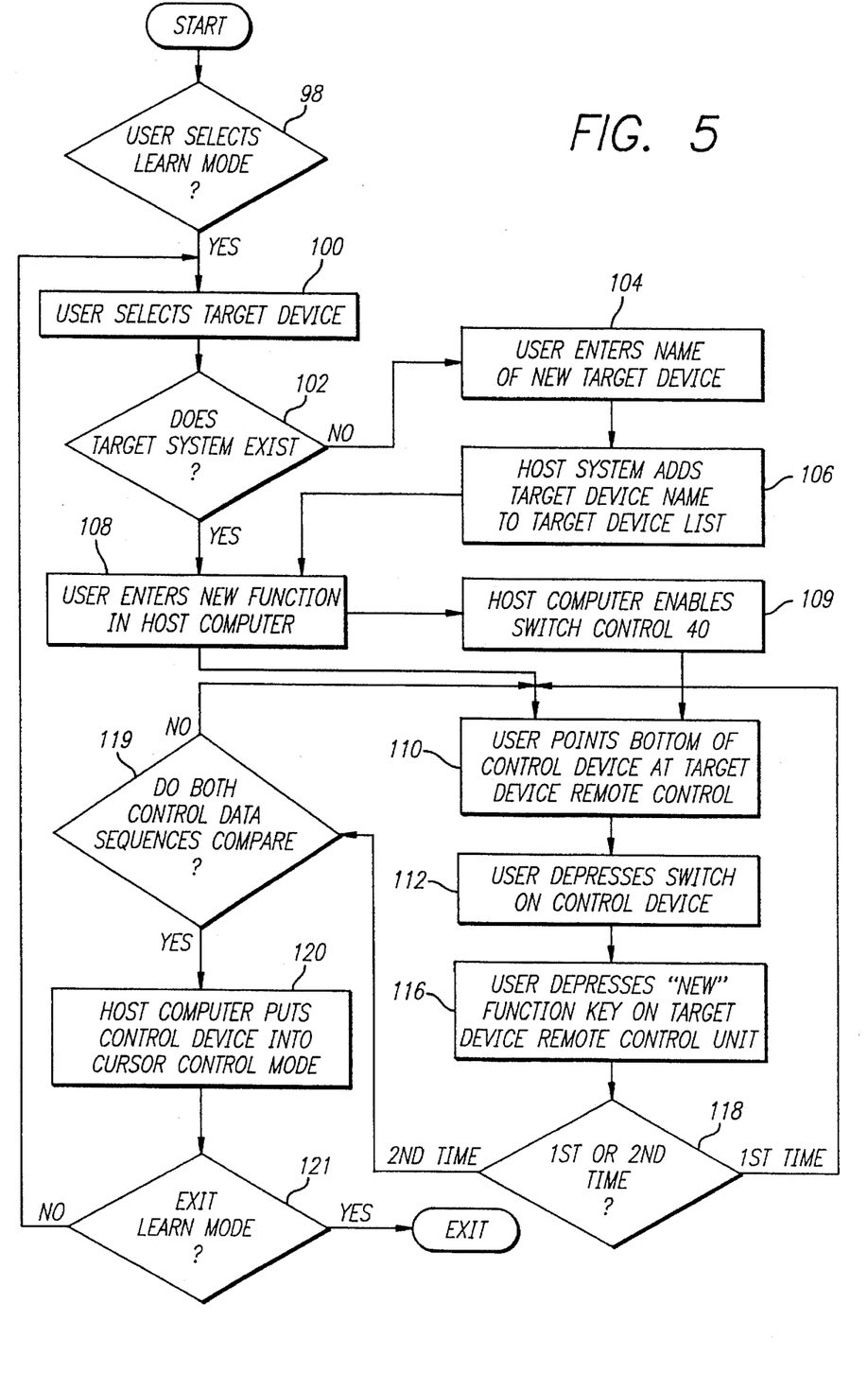
FIG. 5 is a flow control diagram of the learn mode of the present invention.

Referring now to FIG. 5, a flow diagram of the learn mode of the present invention is illustrated. Learn mode allows the user to add both new target device systems functions to the host system configuration. In this way, any target device using a remote control unit in the same optical band as control device 30 can be "learned" by host computer 34. Even if the format for the control data of the desired target system's remote control is completely different than any other target device, host computer 34 can still learn the sequence for the control data. To enter learn mode, the user selects the mode selection menu. Within the mode selection menu, the user selects the learn mode option as indicated in block 98. The user determines whether a desired target device exists in the host system configuration by viewing the target device list. If the desired target device is not on the target device list, the user is prompted to enter an identifying name of the new target device as shown in block 104. The name is a mere identifier, and the target device name can be any name the user wishes to associate with the new target device. For example, if the user has a second VCR in which the user desired to integrate into a multi-media system, the second VCR could be named "VCR #2". After the user has entered the name of the new target device, host computer 34 adds the new target device to the target device list as well as to the corresponding function list as illustrated in block 106. Next, the user adds functions associated with the new target device such that the control data of the associated functions will be learned by host computer 34.

The procedure for learning functions for a new target device is illustrated at block 108 in the flow diagram of FIG. 5. First, the user is prompted to enter an identifying name of the function. Host computer 34 adds the function name to the function list under the newly created designation for the new target device. At this point, the host system configuration is ready to accept control data. In block 109, host computer 34, through interface 31, enables switch control 40. In block 110, the user points the bottom of control device 30 at the remote control unit for the new target device. In block 112, the user depresses a switch on the control device 30 which places the control device-30 into remote control mode. Next, the user depresses the desired function key on the target device remote control unit as illustrated in block 116. Upon depressing the function key on the target device remote control unit, the control data for the function is transmitted to control device 30. In control device 30, the control data is received and demodulated, and then transferred to the host computer 34. In block 118, host computer 34 determines whether the transmission is the first or second transmission of the function. If it is the first transmission, then the data is stored in a comparison buffer in host computer system 34.

Upon receipt of the first transmission of the control data for the function by host computer 34, host computer 34 prompts the user to repeat the transmission of the control data from the target device remote control unit to the control device 30 as illustrated in block 110. The user executes the procedure of blocks 110, 112 and 116, whereby a second transmission of control data is performed. In block 119, host computer 34 compares the second transmission of the control data to the first transmission of the control data to ascertain any differences. If the control data sequences are the same, the control data is stored in the host system configuration. If the comparison yields that the sequences are not the same, then both transmissions are repeated starting in block 110. The purpose of transmitting the control data twice is to ensure the proper control data is associated with the desired function. The two transmissions reduce the possibility that an error has occurred, and provide control data integrity for the function. In block 120, host computer 34 places control device 30 into cursor control mode. If the user wishes to remain in the learn mode, then the user is prompted by host computer 34 to select a target device system.

Figure 6:
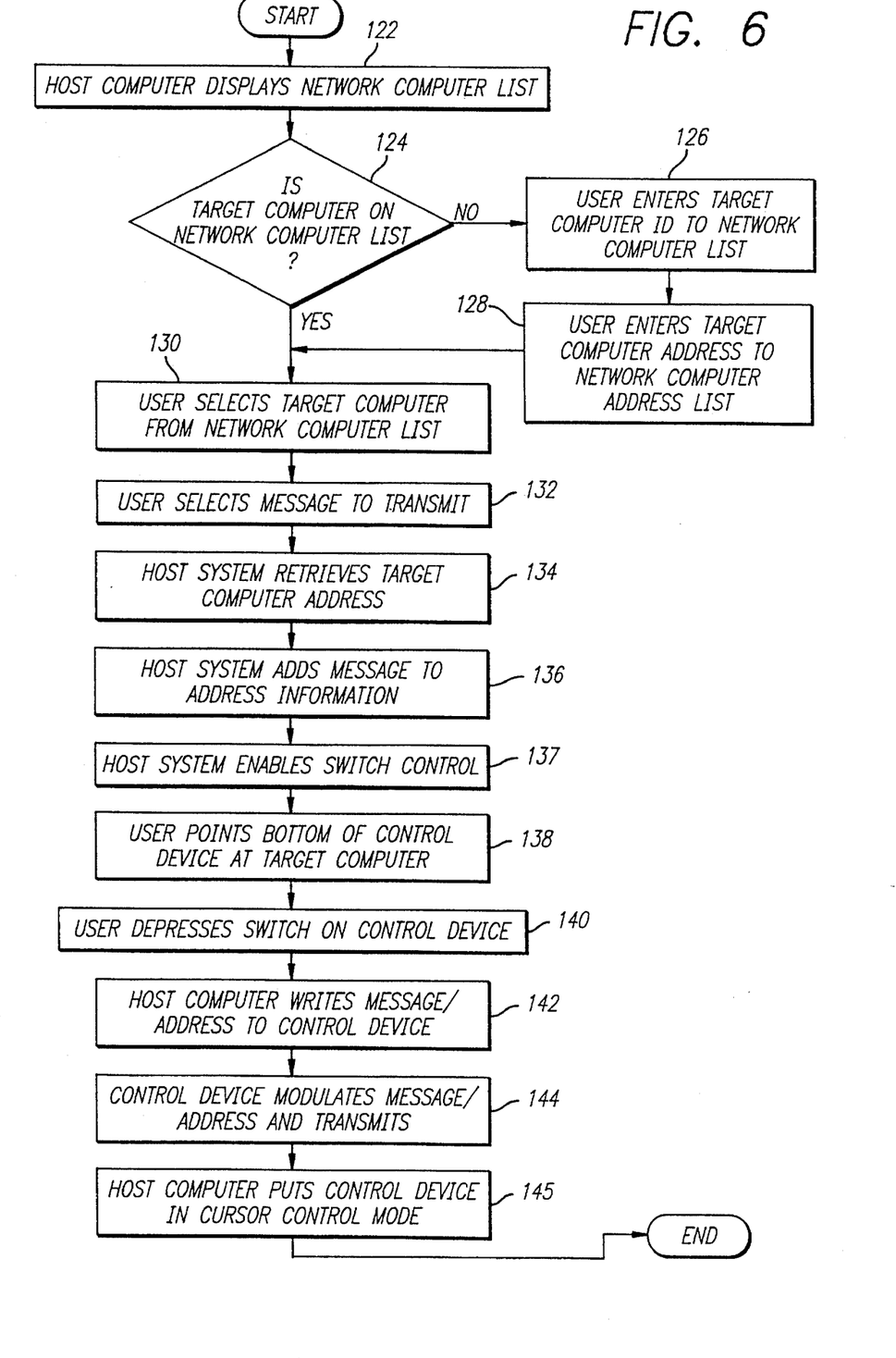
FIG. 6 is a flow control diagram of the computer network mode of the present invention.

Referring to FIG. 6, a flow diagram of the computer networking mode of the present invention is illustrated. After the user has selected the computer networking mode through mode selection module 56, host computer 34 displays the network computer list 72 as shown in block 122. Network computer list 72 contains all the target computers currently supported in the host system configuration. Then, the user ascertains whether the target computer resides on the network computer list 72. If it does not, then the user executes block 126 by entering an identifying name for the new computer to be added to the network computer list 72. In addition to entering a name for the new target computer, the user also enters the target computer address for the network computer address list. Additional hardware could be added to host computer 34 and the target computers to perform higher level networking functions such as address recognition. However, it is currently recognized by practitioners in the art of computer networking, that tradeoffs between implementing certain features directly in electronic circuits or implementing these features in software does not materially change the fundamental nature of the implementation. In order to improve the communication bandwidth and to reduce the likelihood of accidentally issuing a command to a target device, instead of a target computer, a different encoding method may be employed. For example, a different frequency and duration for encoding a logical one state can be employed. In this way, other target computers can ascertain whether another computer is currently transmitting.

When a user desires to transmit a message on the computer network, the user must first select a target computer from the network computer list as illustrated in block 130 of FIG. 6. After the user selects a message to transmit to the target computer, host computer 34 obtains the address for the target computer from the network computer address list as shown in blocks 132 and 134, respectively. In block 136, host computer 34 merges the address information for the selected target computer with the message selected. Then, in block 137, host computer 34 enables switch control 40. To transmit the message to the target computer, the user points the bottom of control device 30 at the target computer and depresses switch 41 on the control device 30 as shown in blocks 138 and 140. Upon depression of switch 41, host computer 34 transfers the message from host computer 34 to control device 30 as illustrated in block 142. In block 144, control device 30 reconstructs the control data into an analog modulated wave form for transmission to the target computer. Upon transmission of the message, host computer 34 places control device 30 into the cursor control mode as illustrated in block 145.

Figure 7:
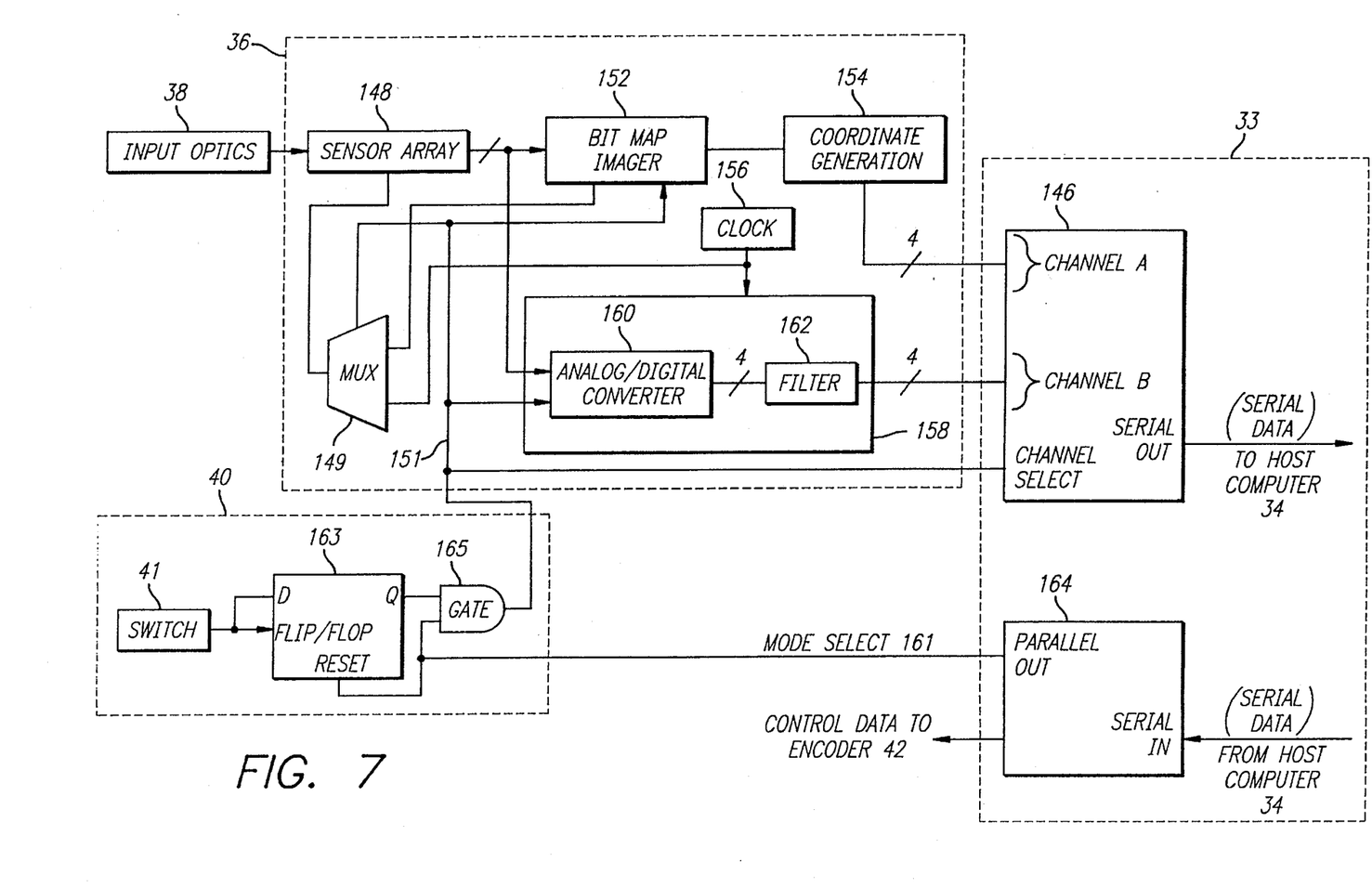
FIG. 7 is a block diagram illustrating the control device decoder of the present invention.

Referring now to FIG. 7, a block diagram of decoder 36, input optics 38, interface control 33 and switch control 40 are illustrated. Input optics 38 receives external signals from reflective pad 46, a target computer or a remote control unit. Preferably, input optics 38 contains an aperture at the bottom of control device 30 which allows the external signal, such as an infra-red signal, to pass into input optics 38. Input optics 38 also contains an optical guide and lens. The external signal passes through the aperture and is amplified and focused by the lens. The external signal is then collimated through the optical guide, and focused upon sensor array 148. The focal distance between the lens and sensor array 148 is a predetermined value. Sensor array 148 may be a single photosensitive cell or an array of photosensitive cells. Photosensitive cells generate an electrical signal proportionate to light intensity incident upon the cell. The photosensitive cells may be photo diodes or any other form of photo voltaic cells. For example, sensor array 148 could be arranged in a 2×2 array of photosensitive cells, or it may be arranged in a linear array comprised of 4 photosensitive cells.

The output of the sensor array 148 is connected in parallel to both the imager 152 and an A to D converter 160. The signal on control line 151 is generated by switch control 40. Switch control 40 contains switch 41, AND gate 165 and D type flip-flop 163. Switch 41 is a momentary micro switch which is accessible to the user at the top of control device 30. The output of switch 41 is coupled to the D and clock inputs of flip-flop 163, preferably through a debouncing circuit (not shown). Flip-flop 163 is reset by mode select 161 such that a falling edge of a high to low signal transition on mode select line 161 initializes flip-flop 163 to a low logic state. AND gate 165 has two inputs; a first input coupled to the Q output of flip-flop 163 and a second input coupled to mode select 161.

Initially, the Q output of flip-flop 163 retains a low logic state. After the user has selected, for example, the learn mode in the host system configuration, host computer 34 sets, through interface control 33, mode select line 161 to a high logic state. At this time, the user depresses switch 41 causing the Q output of flip-flop 163 to toggle to a high logic state. With both mode select 161 and Q output of flip-flop 163 at a high logic state, the output of AND gate 165, which drives control line 151, is set to a high logic state. A high logic state on control line 151 will cause MUX's 172 and 149 to operate in the learn, computer networking, or remote control modes and selects whether the A to D 160 or the imager 152 is active. To convert control device 30 back to the cursor control mode, host computer 34 places mode select 161 in a low logic state, and the falling edge of a high to low signal transition of mode select line 161 resets flip-flop 163 to a low logic state. A low logic state on mode select 161 and an initialized flip-flop 163 pull control line 151 to a low logic state. A low logic state on control line 151 selects the cursor control mode at MUX's 149 and 172.

When control device 30 is in the cursor control mode, decoder 36 generates position data. As described above, control line 151 actuates the imager 152 such that electrical charges generated by sensor array 148 are processed by bit map imager 152. Bit map imager 152 generates a bit map based on the illumination of photosensitive cells in sensor array 148. Preferably, bit map imager 152 consists of cell inhibition logic and timing logic. The cell inhibition logic is coupled to sensor array 148 such that the first cell to obtain a predetermined threshold charge will inhibit other neighboring cells. The inhibition of neighboring cells results in the generation of bit map images. For example, sensor array 148 may contain a 2×1 photosensitive cell array consisting of two linear cells for horizontal movement detection. Applying a cell inhibition technique to the array, one cell will be inhibited when the other cell is illuminated to the predetermined threshold value. In this example, there is a possibility of three bit map images; a first bit map image consists of illumination of the first cell only; a second bit map image consists of illumination of the second cell only; and a third bit map image consists of no cells illuminated. As control device 30 is moved across the horizontal lines of the pad, the photosensitive cell receiving light reflected from the background will illuminate the photosensitive cell to the threshold value faster than the other photosensitive cell receiving light reflected from a horizontal line. A linear 2×1 vertical array senses the movement in a vertical direction in a similar manner. Based on this technique, other more complex arrays, such as a 4×4 photosensitive cell array, could be implemented. Larger arrays provide greater position resolution for cursor control on a video output display.

Once a first bit map image is generated, bit map imager 152 generates signals to clear sensor array 148. Because control device 30 is operating in the cursor control mode, control line 151 selects bit map imager 152 in MUX 149 to control the initialization input to sensor array 148. Bit map imager 152 is self timed because a bit map image will be generated when one or more of the photosensitive cells are illuminated to the threshold value. The first bit map image is transferred to coordinate generator 154 while a second bit map image is being generated in sensor array 148. Preferably, coordinate generator 154 contains comparison means, a look-up table and a quadrature signal generator. The first bit map image is stored in a comparison buffer. The second bit map image is generated from bit map imager 152, and then transferred to a second comparison buffer in coordinate generation 154. Upon receipt of the second bit map image, coordinate generation 154 compares the first bit map image with the second bit map image. The comparison yields a look-up code; the look-up code indicating differences between the first bit map image and the second bit map image.

The look-up code generated from the comparator means is used to index the look-up table. The look-up table generates a control code indicating the direction and distance of the movement of the control device. For example, in the 2×1 horizontal cell array described above, if the first bit map image contained a {1, 0} illumination, and the second bit map image contained a (0, 1) illumination, then the bit map image would generate a control code indicative of a horizontal move to the right. The control code from the look-up table must be converted into the well known quadrature signal format for cursor control devices. The control code is input to the quadrature signal generator, and the quadrature signal generator generates the four quadrature signals. The quadrature signals are input to transceiver 146, and then transferred to host computer 34.

A block diagram of demodulator 158 is illustrated in FIG. 7. As discussed above, the output of sensor array 148 is an analog signal proportional to the light intensity incident upon the photosensitive cells of sensor array 148. In the learn mode, the analog signal is the modulated control data from the remote control unit. In the computer networking mode, the analog signal is the modulated message from a target computer. The analog signal is input to demodulator 158 in analog to digital (A/D) converter 160. Methods for A/D conversion are well known in the art, and A/D converter 160 may employ a flash method, a half flash method, or any other method of analog to digital conversion. The initialization of sensor array 148 is controlled by the output signal of MUX 149. In the computer networking or learn modes, control line 151 selects clock 156. In operation, the photosensitive cells of sensor array 148 are illuminated during a first phase of the clock 156 cycle. During the second phase of the dock cycle, A/D converter 160 reads illuminated cell values, and clock 156 dears the photosensitive cells in sensor array 148.

In the preferred embodiment, the sampling frequency of dock 156 is 500 Khz. Typically, a remote control unit modulates each bit of control data in 600 microsecond pulses. A logical one bit of control data is represented by a 50 Khz tone modulated on the 600 microsecond pulse, and a logical zero bit is represented by no tone modulated on the 600 microsecond pulse. For this control data modulation scheme, A/D converter 160 samples the analog input signal five times the highest input frequency. Therefore, at a sampling frequency five times the input frequency of the analog signal, demodulator 158 generates a digital signal which accurately represents the input analog signal. Using A/D conversion, the operation of control device 30 is not dependent upon the format of the input control data signal.

The digital output of A/D converter 160 is input to filter 162. Preferably, filter 162 is an anti-alaising filter that filters out the sampling harmonics generated by the sampling of A/D converter 160. The bandwidth characteristics of filter 162 are determined by the sampling frequency of dock 156, and if the input analog signal is sufficiently over sampled, a wide bandwidth for filter 162 does not degrade system performance. The output of demodulator 158 is input to channel B of transceiver 146. In the preferred embodiment, transceiver 146 is a universal asynchronous receiver transmitter (UART) which is a standard interface between a cursor control device and a host computer. Control line 151 is connected to channel select on transceiver 146. The selecting of channel A or channel B of transceiver 146 is determined by the logic state of control line 151. A logic low state on control line 151, designating control device 30 is in the cursor control mode, selects channel A. Alternatively, a logic high state on control line 151 selects channel B when control device 30 is in the learn, remote control or the computer networking modes.

Figure 8:
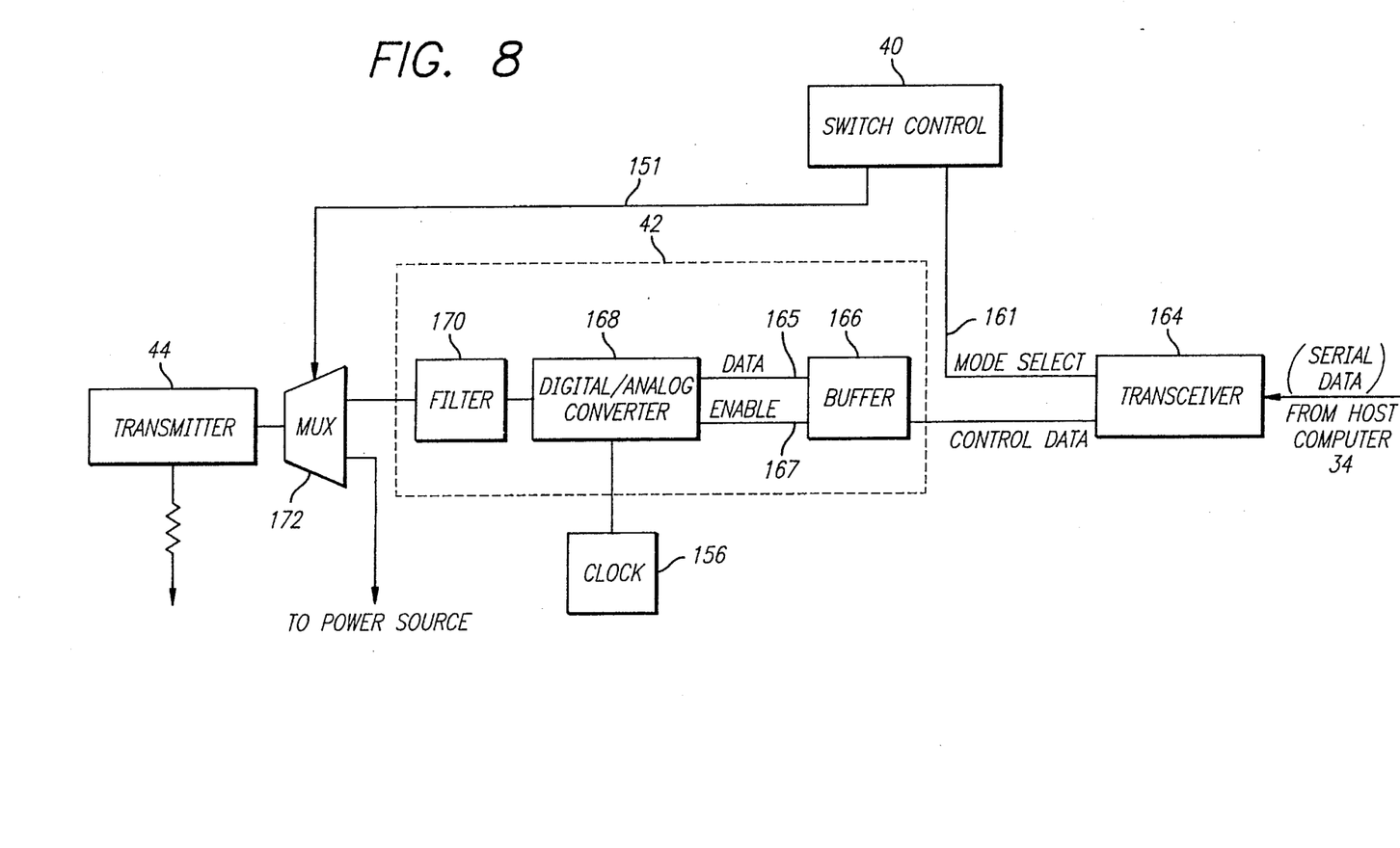
FIG. 8 is a block diagram illustrating the control device encoder of the present invention.

Referring to FIG. 8, encoder 42, transceiver 164 and transmitter 44 are illustrated. Control data transferred from host computer 34 is received by control device 30 at transceiver 164. Control data are input to encoder 42, and encoder 42 generates a modulated signal. The output of encoder 42 is a first input to MUX 172, and a second input to MUX 172 is coupled to a power source for control device 30. The output of MUX 172 is coupled to transmitter 44. When control-device 30 is in the cursor control mode, control line 151 selects the power source input to transmitter 44. In the preferred embodiment, transmitter 44 is an infrared light emitting diode (LED). Therefore, in the cursor control mode, the LED is supplied a constant power source, and the output of transmitter 44 will not be modulated. Alternatively, when control line 151 selects the encoder 42 output, the modulated signal generated by encoder 42 is transmitted by the LED.

The input to encoder 42 is the control data, in digitized form, transmitted from host computer 34. Transceiver 164 will receive control data at a serial bit rate corresponding to the data transferred from host computer 34 to transceiver 164. Encoder 42 contains buffer 166, digital to analog converter (DAC) 168 and filter 170. Control data is transferred from transceiver 164 to buffer 166 in encoder 42. Buffer 166 stores a plurality of control data entries allowing encoder 42 to receive the control data at a data rate driven by transceiver 164. Buffer 166 is coupled to DAC 168 by data lines 165 and enable line 167. Buffer 166 generates a signal over enable line 167 signifying control data has been received by buffer 166. Once DAC 168 is enabled by enable line 167, DAC 168 begins to clock in control data stored in buffer 166 at the clocking rate of clock 156. Control data is converted in DAC 168 from digital data to an analog signal. In the remote control mode, the analog signal is a reconstruction of the analog signal received by control device 30 in the learn mode. In the computer networking mode, the analog signal is a modulated message transferred from host computer 34. The analog output of DAC 168 is input to filter 170. Filter 170 reduces or eliminates frequencies generated in the digital to analog process of DAC 168. Filter 170 has a sufficient bandwidth to accommodate the reconstruction of a wide range of control data.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is:

1. An apparatus for controlling at least one target device and for operating as an input control device for a computer system, said apparatus comprising:

a host computer comprising an output display and a host configuration for storing control data and for permitting selection of a plurality of operating modes including a remote control mode and a cursor control mode, and for permitting selection of a function for said target device, said host configuration being constructed to generate a mode select to indicate said operating mode, and control data corresponding to said function selected for said target device when operating in said remote control mode;

a control device coupled to receive said mode select and said control data from said host computer, said control device comprising:

an encoder for encoding said control data when said mode select indicates selection of said remote control mode;

a reflective pad;

a transmitter, coupled to said encoder, for transmitting said control data encoded to said target device when said mode select indicates selection of said remote control mode, and for transmitting a constant signal to said reflective pad when said mode select indicates selection of said cursor control mode; and a decoder coupled to receive an input, said decoder being constructed to receive said constant signal transmitted from said reflective pad to generate said position data for said host computer to control placement of a cursor on said output display when said control device is operating in said cursor control mode.

2. The apparatus as set forth in claim 1, wherein said control device further comprises a switch coupled to said encoder such that activation of said switch supplies said control data encoded to said transmitter when said control device is operating in said remote control mode.

3. The apparatus as set forth in claim 2, wherein:

said plurality of operating modes in said host configuration includes a learn mode to enter, into said host configuration, new control dam;

said decoder comprises a demodulator to demodulate external data for generation of said new control data, said decoder being constructed to receive said mode select and coupling said input to said demodulator to generate control data for said host computer to control placement of a cursor on said output display when said control device is operating in said cursor control mode; and said switch being coupled to said decoder such that activation of said switch selects said demodulator when said control device is operating in said learn mode.

4. The apparatus as set forth in claim 1, wherein:

said plurality of operating modes in said host configuration includes a computer networking mode to communicate with at least one second computer;

said decoder comprises a demodulator to demodulate messages transmitted from said second computer, said decoder being constructed to receive said messages and couple said messages to said demodulator; and a switch coupled to said decoder such that activation of said switch selects said demodulator when said control device is operating in said computer networking mode.

5. The apparatus as set forth in claim 1, wherein said host system configuration comprises a function list and a target device list, said target device list comprises an identifier for at least one target device, and said function list comprises a corresponding at least one function for said at least one target device identified, said host computer being constructed to generate control data for each function on said function list corresponding to said at least one target on said target list.

6. The apparatus as set forth in claim 1, wherein said host system configuration comprises a user interface including mode selection, said mode selection being constructed to display a plurality of icons to graphically represent a remote control mode, a cursor control mode, a learn mode, and a computer networking mode to permit selection of said operating mode, said user interface being constructed to display a plurality of functions for said target device to permit selection of a function for said target device.

7. A method for controlling at least one target device and for operating as an input control device for a computer system, said method comprising the steps of:

storing control data in said host computer, said control data specifying at least one function for said target device;

permitting selection of a plurality of operating modes in said host computer including a remote control mode and a cursor control mode;

permitting selection of said at least one function for said target device in said host computer;

generating a mode select to indicate said operating mode selected;

retrieving said control data corresponding to said function selected for said target device when operating in said remote control mode;

encoding said control data when said mode select indicates selection of said remote control mode;

transmitting said control data encoded when said mode select indicates selection of said remote control mode;

transmitting a constant signal to a reflective pad when said mode select indicates selection of said cursor control mode; and decoding said constant signal to generate position data for said host computer to control placement of a cursor on an output display of said host computer when said control device is operating in said cursor control mode.

8. The method as set forth in claim 7, further comprising the step of providing a switch, such that activation of said switch results in transmission of said control data when said control device is operating in said remote control mode.

9. The method as set forth in claim 8, wherein the step of storing control data in said host computer comprises the step of generating a function list and a target device list, said target device list comprises an identifier for said at least one target device, and said function list comprises at least one function for said at least one target device.

10. The method as set forth in claim 8, wherein the step of permitting selection of a plurality of operating modes comprises the step of:

permitting selection of a learn mode to enter, into said host computer, new control data;

entering into said learn mode including receiving external data;

demodulating external data for generation of said new control data, such that activation of said switch demodulates said external data for operation in said learn mode; and storing said new control data in said host computer.

11. The method as set forth in claim 10, wherein the step of entering into said learn mode comprises the steps of:

permitting selection of said at least one target device in said host computer;

permitting entry in said host computer of a name for a target device when said target device is a new target device;

permitting entry in said host computer of a function name for a new function;

activating said switch on said control device; and transmitting external data representing said function from said target device to said host computer by activating said function in said target device.

12. The method as set forth in claim 11, wherein the step of transmitting external data representing said function from said target device to said host computer comprises the steps of:

storing said external data transmitted in a register in said computer system;

re-transmitting external data representing said function from said target device to said host computer by activating said function in said target device;

comparing said external data stored in said register with said external data re-transmitted; and requesting a third transmission of said external data when said external data stored in said register does not compare with said external data retransmitted.

13. The method as set forth in claim 8, wherein the step of permitting selection of a plurality of operating modes comprises the step of:

permitting selection of a computer networking mode to transmit and receive messages from a second computer;

entering into said computer networking mode including receiving said messages;

demodulating said messages transmitted from said second computer; and transferring said messages to said host computer.

14. A multi-media computer system comprising:

at least one target device;

a host computer comprising an output display and a host configuration, said host configuration for storing control data and for permitting selection of a plurality of operating modes including a remote control mode and a cursor control mode, and for permitting selection of a function for said target device, said host configuration being constructed to generate a mode select to indicate said operating mode, and control data corresponding to said function selected for said target device when operating in said remote control mode;

a control device coupled to receive said mode select and said control data from said host computer, and for generating input data, including position data, for said host computer when said mode select indicates selection of said cursor control mode, said control device comprising:

an encoder for encoding said control data when said mode select indicates selection of said remote control mode;

a reflective pad;

a transmitter, coupled to said encoder, for transmitting said control data encoded to 8aid target device when said mode select indicates selection of said remote control mode, and for transmitting a constant signal to said reflective pad when said mode select indicates selection of said cursor control mode; and a decoder coupled to receive an input said decoder being constructed to receive said constant signal from said reflective pad to generate a said position data for said host computer to control placement of a cursor on said output display when said control device is operating in said cursor control mode.

15. The multi-media computer system as set forth in claim 14, wherein said control device further comprises a switch coupled to said encoder such that activation of said switch supplies said control data encoded to said transmitter when said control device is operating in said remote control mode.

16. The multi-media computer system as set forth in claim 15, wherein:

said plurality of operating modes in said host configuration includes a learn mode to enter, into said host configuration, new control data;

said decoder comprises a demodulator to demodulate external data for generation of said new control data, said decoder being constructed to receive said mode select and coupling said input to said demodulator to generate control data for said host computer to control placement of a cursor on said output display when said control device is operating in said cursor control mode; and said switch being coupled to said decoder such that activation of said switch selects said demodulator when said control device is operating in said learn mode.

17. The multi-media computer system as set forth in claim 14, wherein:

said plurality of operating modes in said host configuration includes a computer networking mode to communicate with at least one second computer;

said decoder comprises a demodulator to demodulate messages transmitted from said second computer, said decoder being constructed to receive said messages and couple said messages to said demodulator; and a switch coupled to said decoder such that activation of said switch selects said demodulator when said control device is operating in said computer networking mode.

18. The multi-media computer system as set forth in claim 14, wherein said host system configuration comprises a function list and a target device list, said target device list comprises an identifier for at least one target device, and said function list comprises a corresponding at least one function for said at least one target device identified, said host computer being constructed to generate control data for each function on said function list corresponding to said at least one target on said target list.

* * * * *